sutton et al.

United States Patent [19]

[11] Patent Number: 5,696,628

[45] Date of Patent: Dec. 9, 1997

[54] METHOD FOR MANUFACTURING OPTICAL COMPONENTS WITH PERIODIC OR QUASI-PERIODIC OPTICAL PROPERTIES

[75] Inventors: Philip Sutton, Hampshire; Arthur Maitland, deceased, late of St. Andrews, by John Sullivan, executor; Ewan D. Findlay, St. Andrews, all of United Kingdom

[73] Assignee: The Secretary of State for Defence in Her Brittanic Majesty's Government of the United Kingdom of Great Britain and Northern Ireland of Defence Research Agency, Hants, United Kingdom

[21] Appl. No.: 335,720

[22] PCT Filed: Mar. 8, 1994

[86] PCT No.: PCT/GB94/00447

§ 371 Date: Jun. 1, 1995

§ 102(e) Date: Jun. 1, 1995

[87] PCT Pub. No.: WO94/20868

PCT Pub. Date: Sep. 15, 1994

[30] Foreign Application Priority Data

Mar. 11, 1993 [GB] United Kingdom ............... 9305031
Aug. 2, 1993 [GB] United Kingdom ............... 9316002

[51] Int. Cl.$^6$ ............... G02B 5/18; G02B 3/00; G02B 6/34
[52] U.S. Cl. ............... 359/566; 359/9; 359/3; 359/901; 385/124; 430/3
[58] Field of Search ............... 359/9, 566, 653, 359/901, 3; 385/124; 430/3

[56] References Cited

U.S. PATENT DOCUMENTS 4,400,056  8/1983  Cielo ............... 385/27
4,672,012  6/1987  Heitmann et al. ............... 430/3

FOREIGN PATENT DOCUMENTS 57-208515  12/1982  Japan.

OTHER PUBLICATIONS

Gudzenko et al, "Residual changes . . . ", Sov. Tech. Phys. Lett., vol. 5, No. 11, p.580, Nov. 1979.

Primary Examiner—Jon W. Henry
Attorney, Agent, or Firm—Nixon & Vanderhye P.C.

[57] ABSTRACT

A method for manufacturing optical components having a periodic or quasi-periodic structure such as diffraction gratings, volume holograms or distributed feedback mirrors in optical fibers. An optical medium is subjected to acoustic waves which induce periodic or quasi-periodic changes in the optical properties of the medium, the changes being at least partially retained on removal of the waves. The changes may result from stress associated with the antinodes of an acoustic standing wave, alteratively the stress distribution associated with a travelling acoustic wave in an electro-viscous liquid may be semi-permanently retained by the solidification of the material resulting from the application of an electric field.

12 Claims, 4 Drawing Sheets

METHOD FOR MANUFACTURING OPTICAL COMPONENTS WITH PERIODIC OR QUASI-PERIODIC OPTICAL PROPERTIES

BACKGROUND OF THE INVENTION

1. Field of the Invention

The invention relates to the creation of optical components such as permanent diffraction gratings, volume holographs and distributed feedback mirrors in optical fibres where such components have a periodicity or quasi-periodicity in an optical property. The invention, in its various embodiments, can rely on periodic or quasi-periodic phase and/or amplitude effects to provide for example both phase gratings and amplitude gratings and phase holographs and amplitude holographs.

2. Discussion of Prior Art

At present, permanent diffraction gratings and holographs are created using techniques which are based on machining, etching or photographic processes. In current practice, non-permanent, ephemeral diffraction gratings are generated in transparent media using acoustic waves to produce cycles of compression and rarefaction which are accompanied by changes in refractive index. Cells in which acousto-optic diffraction gratings are created are known as "Bragg cells". All Bragg cells require a constant acoustic input from a suitable transducer to maintain the diffraction grating within the acoustic-optic medium.

Temporary diffraction gratings may be formed using acoustic waves by means of a suitable transducer which creates an acoustic standing wave in a chosen medium.

The acousto-optic grating created within a Bragg cell may be the result of a standing wave system produced by the acoustic transducer according to the boundary conditions within the cell or the acousto-optic grating may be the result of a travelling wave system. In the one case the grating nodes and antinodes are spatially stationary while, in the other, their location is time-dependent.

Present methods for creating distributed feedback mirrors (DFB) mirrors are centred around semiconductor lasers [H Kogelnik and C V Shank, "Coupled-Wave Theory of Distributed Feedback Lasers", J. Appl. Phys. 43(5) 2327 (1972)], photodetectors [K Kishino et al. IEEE J. of Quantum Electronics, QE27(8) 2025 (1991)] and multilayer laser mirrors deposited on glass or a crystal substrate [E Hecht "Optics" (2nd Ed.) Wiley International (1987)]. There is no known method at present for creating a DFB mirror within a continuous length of optical waveguide or fibre.

SUMMARY OF THE INVENTION

The object of the present invention is to provide apparatus and methods for utilising the changes produced in media by acoustic or electric/waves and 'freezing' these changes such that gratings, volume holographs and distributed feedback (DBF) mirrors persist after removal of the acoustic waves.

The invention provides in one form a method for manufacturing optical components having a periodic or quasi-periodic structure such as diffraction gratings, volume holographs or distributed feedback mirrors for optical fibres wherein:

a. an optical medium is subjected to radiation from a source of acoustic or electrical waves to produce acoustic or electrical waves in the medium; and b. the medium is treated such that the structure of the medium is altered in regions stressed by the presence of antinodes of the waves and the altered structure is at least partially retained on removal of the source of the waves.

In another form the invention provides a method for manufacturing optical components having a periodic or quasi-periodic structure such as diffraction gratings, volume holographs or DBF mirrors for optical fibres wherein:

a. an optical medium is selected such that it can be structurally altered in regions of high stress produced by an acoustic wave in the medium; and a. the medium is subjected by means of a source of acoustic waves to produce acoustic waves in the medium such that the structure of the medium is altered in regions of the medium stressed by the presence of antinodes of the acoustic waves and the altered structure is at least partially retained on removal of the acoustic waves.

The formation of an acoustic or electrical standing wave in or the passage of such waves through a medium puts the medium under stress at the positions of the anti-modes of the waves. The inventors have realised that this variation in local stress, periodic in the case of a standing wave, can be utilised by careful processing of the medium such that the stress pattern is effectively remembered by the medium.

The method may make use of standing waves or travelling waves in the medium. Where the waves are such that the stress applied to the medium at the antinodes is sufficient to damage the material then no further processing of the medium may be needed to produce the required grating, holograph or DFB mirror. In those media where the damage to the antinode areas is insufficient to produce a practical grating or holograph a second material can be injected into the medium such that it alters the optical properties of the medium at the positions of the antinodes. The second material may be such as to form a heterogeneous mixture/solution with the first medium in such a way as to produce concentration gradients resulting in spatial refractive index variations which follow the acoustic standing wave distributions.

The grating may be formed by an accumulation of light scattering particles in the regions of nodes of the acoustic standing wave pattern in a medium seeded with suitable particles. Changes are then induced in the medium to ensure that the grating pattern of scattering particles is retained permanently by the medium when the wave source is switched off.

The grating may be formed in the medium by the refractive index variations which are due to, and follow, the pattern of nodes and antinodes of the distribution of acoustic standing waves. Changes are then induced in the medium to ensure that the grating pattern of refractive index changes is retained permanently by the medium when the source of waves is switched off/removed. In one such arrangement, a reaction mixture is made of components of a matrix medium, a standing wave is then generated in the mixture while the matrix medium forms such that stress variations caused by the standing wave periodically aid and inhibit matrix formation and finally the wave source is removed to leave a periodic grating structure.

A further step in the method is to add a further chemical component after application of the standing wave to promote setting of the matrix material.

In a further arrangement the grating material is selectively doped. This may be applied after setting up a standing wave in a setting gel and then applying the dopant material in contact with the gel such that the dopant diffuses selectively into (or away from) the high stressed regions of the antinodes of the standing wave.

In an arrangement for producing a phase grating in glass, the glass is first heated above its transformation temperature and then an acoustic standing wave is applied while the glass is cooled below the transformation temperature such that the glass becomes birefringent at the locations of the antinodes of the acoustic standing wave. In order that the spacing between antinodes should be constant as the temperature of the glass varies the frequency of the acoustic wave may be varied in dependence on the glass temperature.

The invention may be applied to the manufacture of surface gratings placing a surface of a suitable substrate material in contact with a fluid etching agent and then, in one arrangement, establishing a longitudinal acoustic wave in the etching agent such that the etching agent preferentially acts on the surface of the substrate at the positions of the antinodes of the longitudinal acoustic wave. In a second arrangement, a transverse surface acoustic wave (SAW) is established in the surface of the substrate such that the etching agent preferentially acts on the surface of the substrate at the positions of the antinodes of the transverse acoustic wave.

The above arrangements lead to permanent phase or amplitude gratings after removal of the standing wave. In another embodiment of the invention a semi-permanent grating is produced as follows:

an electro-viscous medium is used and a travelling acoustic wave applied to this medium, an electric field is then applied to the medium to cause a change of phase of the electro-viscous material from liquid to solid in such a way as to retain the essential features of the stress distribution and the associated refractive index distribution. This grating persists once the acoustic standing wave is removed but lasts only as long as the electric field is applied. This arrangement is suitable for matched filter applications where a portion of the travelling acoustic wave can be captured in the electro-viscous medium and then compared with a known wave using known electro-optic techniques.

All of the above arrangements can be applied using multiple acoustic sources and resonant cavities to establish complex two and three dimensional patterns.

By using more than one acoustic transducer and choosing the locations of the individual transducers, gratings of great complexity can be formed. If the frequency at which each transducer is driven is also introduced as an option, gratings of almost any spatial design can be produced within the limitations of the boundary conditions which dictate the standing wave nature of the vibration pattern produced. Such gratings have the character of volume holograms.

In another form the invention provides a method for manufacture of a permanent distributed feedback mirror in an optical fibre comprising the steps of:

a) heating a section of an optical fibre above the transformation temperature of the fibre core at a location where a distributed mirror is required;

b) transmitting an acoustic wave along the optical fibre so as to generate an acoustic standing wave in the heated section of the fibre; and c) cooling the heated section below the transformation temperature while maintaining the acoustic wave.

Advantageously a temperature controlled oven is provided for heating the optical fibre and the acoustic energy and the frequency thereof transmitted through the heated section of the optical fibre is monitored so as to stabilise the location of the acoustic standing wave in the heated section.

The DBF mirrors are preferably created by injecting a high frequency acoustic wave in the frequency range of 1-10 GHz into the optical fibre.

BRIEF DESCRIPTION OF THE DRAWINGS

The invention will now be described by way of example only with reference to the accompanying Drawings of which.

DETAILED DESCRIPTION OF THE PREFERRED EMBODIMENTS

Figure 1:
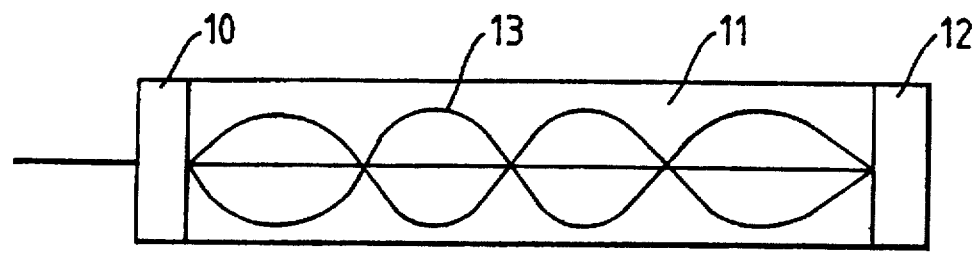
FIG. 1 illustrates application of the invention to manufacture of a one dimensional single frequency diffraction grating.

FIG. 1 illustrates a means for making a one dimensional diffraction grating. A transducer (10) is coupled to one end of a grating medium (11) and a reflector (12) is placed at the end of the medium opposed the transducer. The transducer is driven at a constant frequency f and the spacing L between transducer (10) and reflector (12) is arranged such that an acoustic standing wave (13) is established in the medium (11) where the spacing between nodes is equal to the required line spacing of the grating. Thus the length L is given by:

$$L = nv/2f \tag{1}$$

where:

v is the speed of sound in the medium (11); and n is the number of grating lines (i.e. nodes) in the length L.

According to a first arrangement, the amplitude of the standing wave is chosen such that the stress applied to the medium at the antinodes exceeds the elastic limit of the medium whereby a structural periodicity remains after the acoustic wave is removed. Alternatively, in this arrangement a set gel could be selectively destroyed at positions of the antinodes of the acoustic wave.

Figure 2:
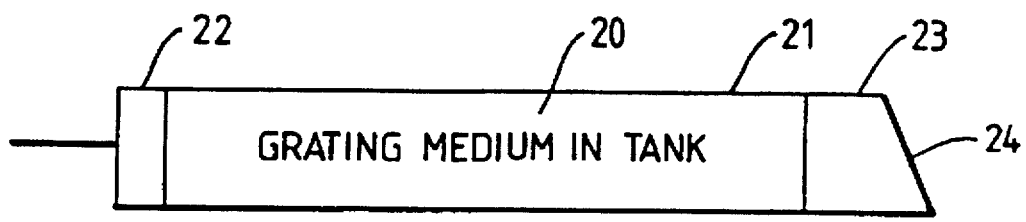
FIG. 2 is a diagram of a one-dimensional gel tank implementation of the invention.

In a further arrangement shown in FIG. 2, colloidal dispersive particles are added to an unset gel to form a uniform suspension within the gel. The gel (20) is then put in a tank (21) having one end wall formed by a transducer (22) and the opposed end wall formed by a reflector (23). As in the first arrangement an acoustic standing wave is established in the gel. This results in a migration of the dispersive particles towards the nodes of the standing wave pattern. The standing wave is removed after the gel sets such that the dispersive particles do not diffuse away from the regions of higher concentration. The outer face (24) of the reflector (23) is slanted to prevent further standing waves being set up by reflection from the face (24).

The apparatus shown in FIG. 2 may be used for a further arrangement of the invention. The tank (21) is filled with a reaction mixture of component parts of a pre-selected matrix medium. An acoustic standing wave is applied to this 'molecular soup' such that the variations in stress caused by the acoustic wave periodically aid and inhibit matrix formation. Some molecules require a high degree of mixing to form properly. Application of the acoustic wave creates a differential rate of molecular production and hence a diffraction grating when the mixture is set, for instance, by the addition of some other chemical.

Figure 3:
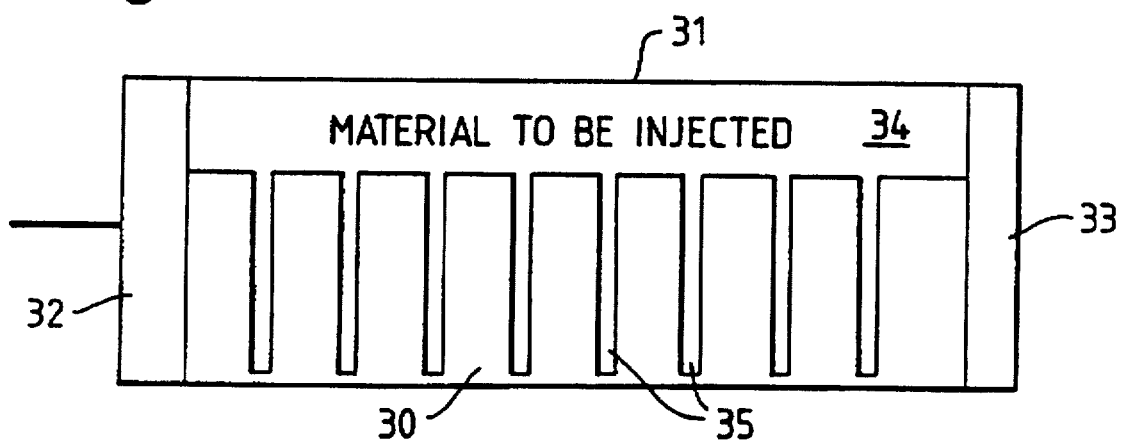
FIG. 3 illustrates a simple matrix disruption method for creating a phase grating using a solid gel and a dopant.

FIG. 3 shows an arrangement of selective doping of a solid medium insonified by means of a standing acoustic wave. In similar manner to the arrangements already described a standing acoustic wave is set up in a gel 30 in a resonant enclosure 31 by means of opposed transducer 32 and reflector 33. Above the gel 30 there is provided material 34 to be injected into the gel. Such material could be dispersive, it could have a higher or lower refractive index than the gel medium or it could act as a dopant to lower the refractive index on introduction, as for example water introduced into gelatine. Heat may be applied to promote injection of the material into the insonified gel. As shown, the material enters most easily at the antinodes 35 of the acoustic wave pattern. On removing the acoustic waves the periodic structure of the gel is retained.

Figure 4:
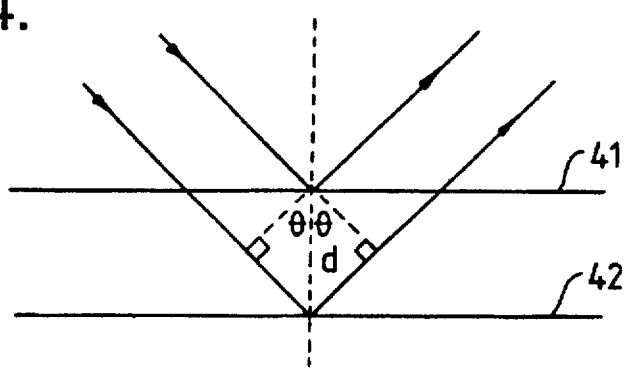
FIG. 4 illustrates Bragg diffraction from a series of single fissure boundaries at the antinodes of an acoustic standing wave in gelatin.
Figure 5:
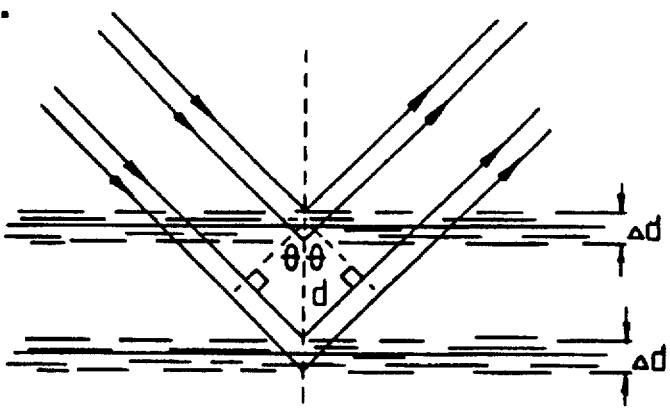
FIG. 5 showns a modification of FIG. 4 corresponding the presence of multiple parallel fissures at the positions of the acoustic antinodes.

In the destructive process the gel is placed in an acoustic cavity and allowed to set. The set gel is then acoustically excited to provide small fissures at the anti-nodes of the acoustic standing waves. The fissures will themselves present a diffraction grating, but the effect can be enhanced by the insertion of another material into the spaces they provide. If the fissures at the acoustic anti-nodes lie in the same plane, all the light scattered from the fissure walls will effectively undergo Bragg diffraction as shown in FIG. 4. In the ideal case all the fissures 41, 42 will occur exactly at the anti-nodes and form a series of continuous planar discontinuities across the space occupied by the acoustic column. In reality we expect the fissures to be disjointed and to spread for some distance on either side of the anti-node as shown in FIG. 5. The effect of the spread will be to give a range of distances d over which the Bragg condition holds:

$$\sin\theta_B = \frac{\lambda_o}{2n_o d} \qquad (2)$$

For a spread of d round every antinode there is a corresponding spread in diffraction angle $\Delta\theta$ given by $$\Delta\theta = \frac{\lambda_o}{2n_o} \frac{\Delta d}{d^2} \frac{1}{\left[1 - \frac{\lambda_o}{2n_o d}\right]^{1/2}} \qquad (3)$$

which for a grating of spacing d=50 µm and a fissure spread of $\Delta$d=5 µm illuminated with a HeNe laser has the value $\Delta\theta$=0.422 mrad which is a twentieth of the actual diffraction angle 2×$\theta_B$=8.44 mrad.

The spread of fissures may also give rise to non-parallel fissures which will scatter light in directions other than that given by the Bragg condition (2). Such effects are unwanted and if they do occur require a remedy. It is possible to make use of the fissure walls other than as scattering surfaces. Instead of using the fissures to introduce a foreign material to aid the scattering process, they are used to introduce more gel with an added dopant at a temperature that will dissolve the fissure walls. This then leads to a gradual transition from the original gel to the doped gel. The result of this gradual transition will be to give a phase grating as opposed to the reflection grating obtained from the fissure walls.

For the constructive method the gel is also placed in an acoustic cavity. The gel is acoustically excited as it sets, thus inhibiting the formation of the gel matrix at the acoustic anti-nodes. If we can change the chemical make-up of the gel solvent as it sets then we can cause a difference in refractive index between the sites of the acoustic nodes and anti-nodes. Throughout this process the acoustic length of the cavity must not change, thus we require a gel solution which has the same acoustic properties as the solid gel. The effect on the system of having solid gel of different acoustic properties to its solution would be to remove the standing wave condition and therefore to disturb the solid gel.

Figure 6:
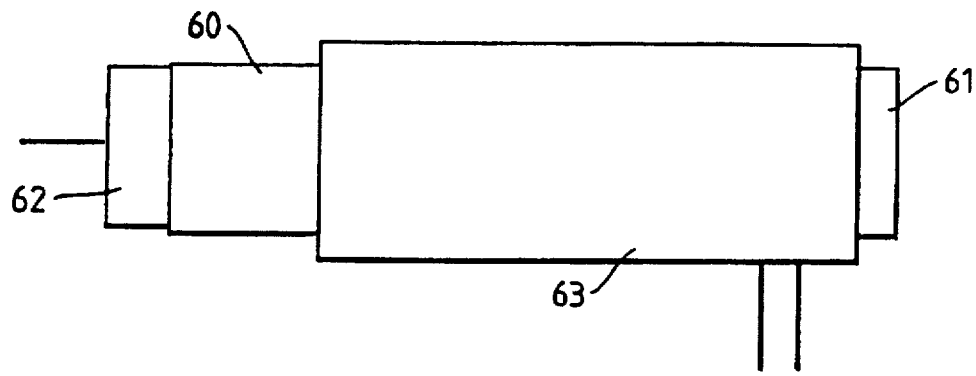
FIG. 6 is a diagram of equipment for producing a grating in glass.

FIG. 6 shows the application of the method to glass. A rectangular slab of glass (60) has one end (61) polished to act as a reflector with a transducer (62) coupled to the remote end. An oven 63, through which the glass can pass, is arranged to heat the glass above its transformation temperature and a longitudinal acoustic wave is introduced through one end of the acoustic cavity to form a phase grating. The glass is then cooled while maintaining an acoustic standing wave. Once cooled below the transformation temperature, the acoustic wave is withdrawn and residual stress induced into the glass at the antinode positions of high stress forms a permanent phase grating.

If we have a glass at or just below its transformation temperature and compress it, it will undergo adiabatic heating, which will carry the local temperature into the transformation region. The imposed compression is therefore held within the structure of the glass. If the same piece of glass is then stretched, as it would be by the rarefaction of a longitudinal acoustic standing wave, the stresses imposed by the compression will not be removed because the glass is adiabatically cooled by the rarefaction and therefore taken outside the transformation region.

The nature of glass is such that at a temperature greater than its transformation temperature, $T_T$, and lower than its annealing temperature, $T_A$, it will hold any stress imposed on it. The range between the two temperatures $T_T$ and $T_A$ is known as the transformation range and is of the order of 5° C. to 30° C. In Pyrex, for example, the transformation range is between 525° C. and 560° C.

Figure 7:
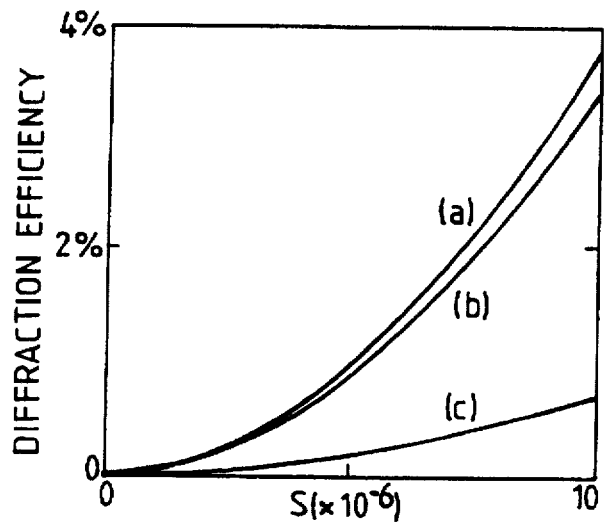
FIG. 7 shows graphs of the variation of diffraction efficiency against strain for three different glasses.
Figure 8:
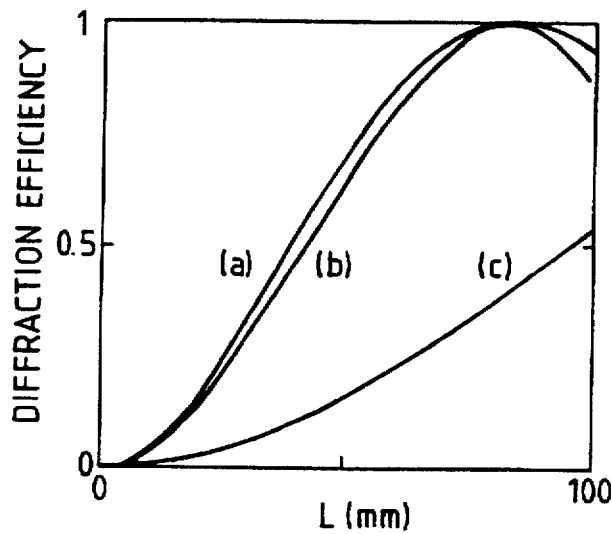
FIG. 8 shows graphs of the variation of diffraction efficiency against interaction length for the same glasses as shown in FIG. 7.

We have calculated the diffraction efficiency for the diffraction of radiation from a HeNe laser by permanent acoustic-optic gratings formed in three different glasses as shown in FIGS. 7 and 8. The Figures show diffraction efficiency against residual strain (FIG. 7) and against interaction length (FIG. 8) for fused silica (a), Schott glass No. 8532 as used for encapsulating photodiodes (b) and Schott glass No. 8330 which is a Pyrex (Reg. Trade Mark) equivalent.

A potential difficulty with this technique is the possible different rates of change with temperature of the velocity of sound and the length L of the acoustic cavity, ie $$\frac{d}{dT} v_a(T) \neq \frac{d}{dT} L(T) \qquad (4)$$

where $v_a$ is the velocity of sound in the glass and L is the acoustic cavity length. The effect of the difference between these two rates of change with respect to temperature can be removed by changing the frequency of the acoustic signal so that it is constantly matched to produce the same number of antinodes over the length of the acoustic cavity.

The invention can also be applied to produce semi-permanent gratings by use of electro-viscous media. An electric field is applied to an electro-viscous medium through which an acoustic travelling wave is established. The electric field causes a change of phase of the medium from liquid to solid in regions of high stress and thus provides a semi-permanent grating representing a snap-shot of the travelling wave in the medium after removal of the acoustic wave. On removal of the electric field the diffraction grating disappears. This technique enables an acoustic wave to be held in the electro-viscous medium in a manner such that it can then be compared with another acoustic signal using standard electro-optic techniques.

In the arrangements thus far described single frequency gratings have been produced. The invention can also be applied using multiple acoustic sources to establish complex two and three dimensional interference patterns.

Figure 9:
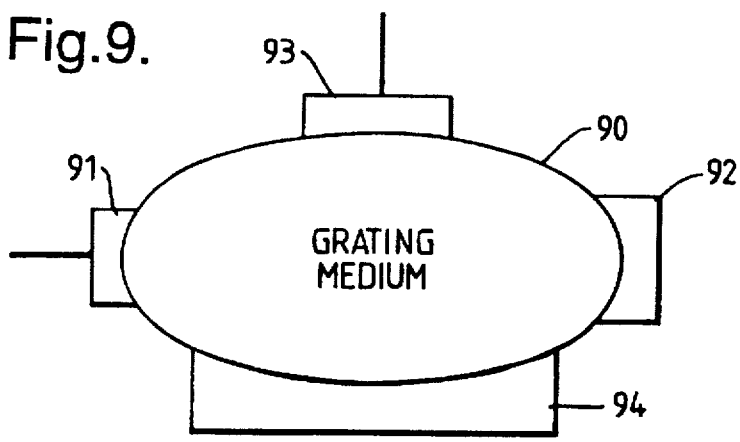
FIG. 9 is a schematic drawing of an arrangement for producing a two dimensional grating.

FIG. 9 shows, for convenience, a simplified arrangement for producing a two dimensional grating making use of any of the one dimensional techniques described above for freezing the acoustic wave pattern in the grating medium 90. The medium 90 is elliptically shaped with surface mounted transducer and reflector pairs 91, 92 and 93, 94 located respectively on the major and minor axes of the medium.

As described the invention has a number of possible uses including:

a) simple diffraction gratings for spectrum analysis b) phase and absorption masks for use in Fourier optics c) filters for rf signal processing by acousto-optic signal processing d) creation of small polarisation dependent graded index lenses.

Figure 10:
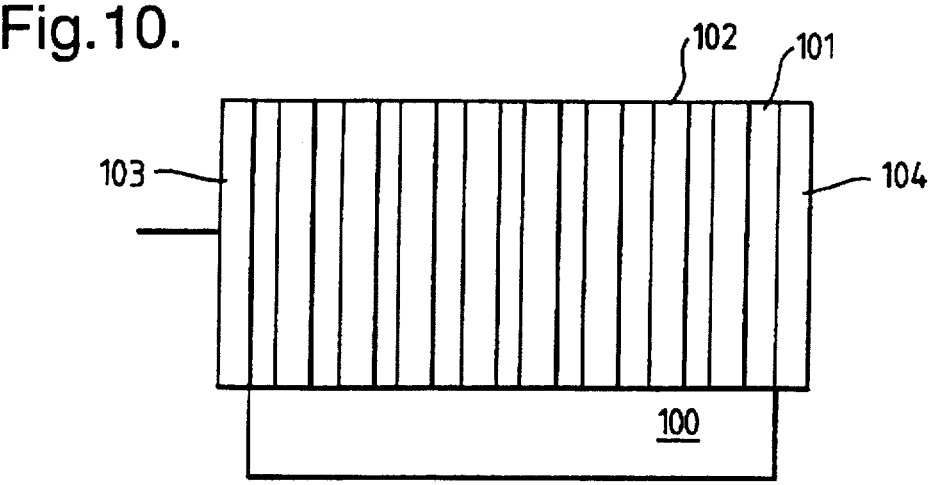
FIG. 10 shows schematically an apparatus for making surface gratings using longitundinal acoustic waves.
Figure 11:
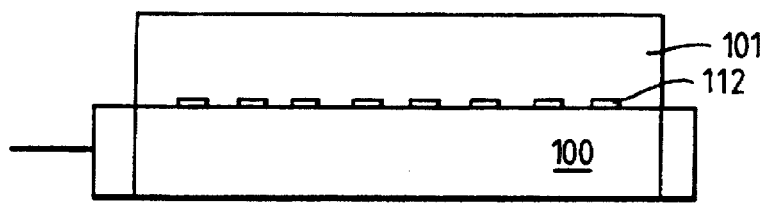
FIG. 11 shows schematically an arrangement for making surface gratings using transverse acoustic waves.

The invention can also be applied to the production of high quality surface gratings on glass, metal or other substrates using an etching process based on acoustics. As shown schematically in FIGS. 10 and 11 a surface grating substrate material 100 is placed in a tank 101 containing a fluid etching agent. An acoustic standing wave (102, 112), of appropriate wavelength, is then set up in the etching agent or on the surface of the substrate material. The effect of the standing wave is to increase the rate of oxidation of the grating substrate at the standing wave antinodes. The increase in the rate of reaction is due to the increased rate of transport of reaction product into the liquid, which increases the amount of etching agent in contact with the substrate at the site of the antinode. Thus there is a differential rate of etching between the nodes and the antinodes of the acoustic standing wave and therefore after a given period of etching a grating will be produced.

The factors affecting the production of such a grating are: the reaction rate between the grating substrate and the etching agent and the relative speeds of sound in the substrate and the etching agent. The three factors are interdependent. If the rate of reaction between the substrate and the etching agent is faster than the rate of transport due to the acoustic wave, then the effect of the acoustically induced transport will be nil. If the rate of reaction is comparable to, or slower than, the rate of transport at the antinodes, then the transport of the reaction product away from the reaction surface will become significant.

The disturbance of the etching fluid at the interface with the substrate, and therefore the differential transport rate due to the acoustic wave is due to the difference in the speed of sound in the two media. In the case where a longitudinal acoustic standing wave is generated between transducer 103 and reflector 104 within the etching agent, since the speed of sound in a rigid solid is far grater than that in a fluid, the acoustic wave, to all intents and purposes, does not enter the grating substrate material 100. Thus acoustic reflection may provide a problem and the grating medium surface will have to be placed exactly perpendicular to the acoustic wave fronts.

In the case where the standing wave 112 is set up using trasverse surface acoustic waves (SAW) in the grating substrate 100, the acoustic disturbance will not penetrate far into the etching fluid due to the acoustic absorbtion in a fluid being greater than that in a well ordered solid. Thus a larger amount of acoustic energy will be required for the SAW case than in the longitudinal liquid wave to produce the same grating spacing because of the higher speed of sound in the solid.

In all cases, providing the acoustic wave is a standing wave, there will be a difference in etching rate between the acoustically mixed and stationary etching medium.

The invention as thus described for producing surface diffraction gratings may also be applied to producing holograms.

Figure 12:
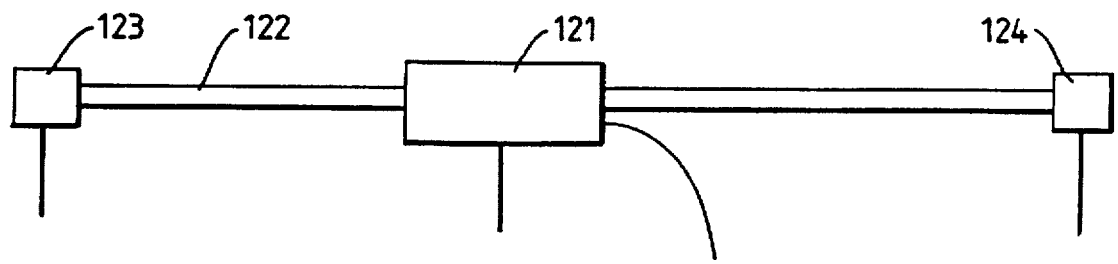
FIG. 12 is a schematic drawing of an apparatus for producing a permanent distributed feedback mirror in an optical fibre.

The invention may also be applied to the manufacture of permanent distributed feedback mirrors in optical fibres. As shown in FIG. 12 a small oven 121 is placed around a section of optical fibre 122 at the point along the fibre where a mirror is required. An acoustic source 123 is coupled to the optical fibre 122 sufficiently distant from the oven to be unaffected by the oven heat and a microphone 124 (sensitive to acoustic energy transmitted along the fibre by the source 123) is coupled to the fibre on the side of the oven remote from the source. The oven temperature is then increased until the waveguide material is above its annealing point (or made molten), which automatically creates an acoustic cavity due to the change in acoustic velocity with temperature. The annealing (molten) region of the optical fibre must comply with the length condition (4) given below.

The acoustic source 123, of frequency $f_{ac}$ (of order GHz) given by equation (3) below, is then switched on and the intensity of the source is increased so as to achieve the maximum possible periodic perturbation of the dielectric without causing permanent damage outside the heated region. The acoustic standing wave established in the optical fibre produces a periodic variation with length in the refractive index of the optical fibre medium. Such variation of refractive index within the heated portion of the optical fibre is equivalent to a diffraction grating within the fibre. At this stage, further tuning of the length of the heated region can be effected by using the microphone 124 to detect when the resonance condition (8), given below, is achieved when a minimum acoustic energy will be transmitted through the heated region of the fibre.

The oven 121 is then switched off and the optical fibre 122 cooled while maintaining the acoustic standing wave to 'freeze' the grating into the material of the heated region and then the acoustic source is turned off. Then when the acoustic standing wave is removed the grating remains permanently in the optical fibre.

The permanent grating in the optical fibre is generated using acoustic waves, which are frozen in place. To freeze the acoustic waves into the fibre core the appropriate section of the fibre is heated to a temperature above which stress patterns are annealed out (or doping ions are free to move). Then after imposing an acoustic standing wave this is frozen into place by dropping the temperature below the annealing point (or returning to the solid state).

The invention may also be used by employing a travelling acoustic wave within the optical fibre in a similar frequency range to create an ephemeral grating, or distributed feedback mirror, within the fibre. The travelling wave grating can be tuned over a range of frequencies and feedback efficiencies depending on the bandwidth and dynamic range of the acoustic source, but it cannot be localised in the optical propagation direction of the fibre as in the case of the permanent mirror.

THEORY OF DISTRIBUTED FEEDBACK MIRRORS

Acoustic waves can be guided down an optical waveguide by the difference between the speed of sound in the optical waveguide and its surroundings. A guided acoustic wave can then be used to form a permanent diffraction grating under the conditions described above.

Such a sinusoidal diffraction grating will have diffraction efficiency (E) given by:

$$E = \tanh^2\left[\frac{\pi n_1 d}{n_0 \lambda \cos\theta_B}\right] \quad (5a)$$

where $n_1$ is the amplitude of the perturbation to the refractive index, d is the depth of the grating, $n_o$ is the unperturbed refractive index, $\lambda$ is the wavelength of the incident light in free space and $\theta_B$ is the Bragg angle, taken to be the angle between the wave vector of the incident radiation and the grating vector. In the case of distributive feedback mirrors within waveguides the Bragg angle is − and thus the diffraction (reflection) efficiency is:

$$E = \tanh^2\left[\frac{\pi n_1 d}{n_0 \lambda}\right] \quad (5b)$$

For an unperturbed refractive index $n_o$ of 1.5 and an optical wave length $\lambda=1.5$ µm, he refractive index perturbation that yields a 1% reflection efficiency is $n_1$ (approx equal to $10^{-7} m^{-1}$.

For the diffracted beam to have the opposite direction of propagation to the incoming beam the Bragg angle has a value of −pi and thus the Bragg condition (cos $\theta_B=\lambda/2\Delta$) becomes:

$$\Delta=\lambda/2 \quad (6)$$

where $\Delta$ is the acoustic wavelength (and therefore grating wavelength) in the medium. For the 'heating, imposition of acoustic field and freezing' method to attain the maximum reflectivity, the acoustic frequency must comply with the following conditions:

$$f_{ac} = \frac{2}{1+\alpha(T_2-T_1)} \cdot \frac{v(T_2)}{n_o\lambda} \quad (7)$$

where $\propto$ is the medium's coefficient of expansion, $v(T_2)$ is the speed of sound at the annealing temperature, $T_2$, of the optical fibre material and $T_1$ is the fibre's operating temperature. For cavity resonance, which increases the efficiency of grating creation, the cold cavity length condition is:

$$L(T_1) = \frac{N}{1+\alpha(T_2-T_1)} \cdot \frac{v(T_2)}{f_{ac}} \quad (8)$$

where N is a positive integer.

The present invention thus also provides a method for producing mirrors within active and non-active optic fibres of different reflectivities and at different wavelengths as desired. Mirrors thus produced are integral to the optical transmission lines and do not therefore incur coupling losses.

Although the invention has been described in relation to the use of acoustic waves it may also be possible to use electrical standing waves of the appropriate wavelength (given by equation 6) within a molten doped glass to redistribute the active ions and thus form a grating.

Insonification of an optical fibre to produce a diffraction grating can also make use of stimultated Brillouin scattering (SBS) in the fibre. Incoming coherent light causes electrostriction of the fibre material and the resulting acoustic standing wave gives a backscattering effect. This can then be frozen in as described above.

We claim:

1. A method for manufacturing optical components having a periodic or quasi-periodic structure, comprising:
   providing an optical medium;
   subjecting said optical media to energy from a source of acoustic waves to produce acoustic waves in the media; and
   treating said media such that the structure of the media is altered in regions stressed by the presence of antinodes of the waves and at least partially retaining the altered structure upon discontinuance of said subjecting step wherein another material is injected into the media said another material comprises a heterogeneous mixture with the optical media so as to produce an accumulation of light scattering particles in the regions of the nodes of the wave pattern producing concentration gradients resulting in spatial refractive index variations which following the wave distributions.

2. A method for manufacturing optical components having a periodic or quasi-periodic structure, comprising:
   providing an optical media capable of being structurally altered in regions of high stress produced by an acoustic wave in the medium; and
   subjecting the medium to energy from a source of acoustic waves to produce acoustic waves in the medium such that the structure of the medium is altered in regions of the medium stressed by the presence of antinodes of the waves and the altered structure is at least partially retained on removal of the waves, wherein said optical medium comprises a reaction mixture made of components of a matrix medium, and, during said subjecting step, a standing wave is generated in the mixture while the matrix medium forms such that stress variations caused by the standing wave periodically aid and inhibit matrix formation within the matrix medium and finally the wave is removed to leave a spatially periodic grating structure.

3. A method for manufacturing optical components as claimed in claim 2 wherein there is included the further step of adding a further chemical component after application of the acoustic standing wave to promote setting of the matrix medium.

4. A method for manufacturing diffraction gratings or volume holographs comprising:
   subjecting an optical medium to energy from a source of acoustic waves to produce acoustic waves in the medium; and
   treating the medium such that the structure of the medium is altered in regions stressed by the presence of antinodes of the waves and the altered structure is at least partially retained upon removal of the waves;
   wherein the optical medium is selectively treated by a dopant;
   wherein a standing wave is first set up in a setting gel and then the dopant is applied in contact with the gel such that the dopant diffuses selectively into or away from the high stressed regions of the antinodes of the standing wave.

5. A method for manufacturing diffraction gratings or volume holographs as claimed in claim 4 wherein the material is selected to be glass, the glass is first heated above its transformation temperature and then an acoustic standing wave is applied while the glass is cooled below the transformation temperature such that the glass becomes birefringent at the locations of the antinodes of the acoustic standing wave.

6. A method for manufacturing diffraction gratings or volume holographs as claimed claim 5 wherein the frequency of the acoustic wave is varied in dependence upon the glass temperature in order that the spacing between antinodes is constant as the temperature of the glass varies.

7. A method for manufacturing diffraction gratings or volume holographs comprising the steps of:

selecting an electro-viscous medium;

applying a travelling acoustic wave to this medium, and applying an electric field to the medium to cause a change of phase of the electro-viscous material from liquid to solid in such a way as to retain the essential features of the stress distribution and the associated refractive index distribution.

8. A method for manufacturing an optical fibre distributed feedback mirror comprising an optical fibre for transmission of laser light characterised in that the refractive index has a periodic variation along a predetermined length of the fibre thereby providing a distributed feedback mirror integral with the fibre comprising the steps of:

a) heating a section of an optical fibre above the transformation temperature of a core of said fiber at a location where a distributed feedback mirror is required;

b) transmitting an acoustic wave along the optical fibre and generating an acoustic standing wave in the heated section of the fibre; and c) cooling the heated section below the transformation temperature while maintaining the acoustic wave.

9. A method for manufacture of a permanent distributed feedback mirror in an optical fibre as claimed in claim 8 wherein said section of optical fibre is located in a temperature controlled oven for heating the optical fibre and said transmitting step includes monitoring the acoustic energy and the frequency thereof transmitted through the heated section of the optical fibre so as to stabilise the location of the acoustic standing wave in the heated section.

10. A method for manufacture of a permanent distributed feedback mirror in an optical fibre as claimed in claim 8 wherein the acoustic wave is selected to have a frequency in the range of 1–10 GHz.

11. A method for manufacturing diffraction gratings or volume holographs in an optical medium, said optical medium comprising a reaction mixture made of the components of a matrix medium, said method comprising the steps of:

subjecting said optical medium to energy from a source of acoustic waves so that a standing wave is generated in the optical medium whilst the matrix medium forms such that stress variations caused by the standing wave periodically aid and inhibit matrix formation within the matrix medium; and removing the energy to leave a spatially periodic grating structure which is at least partially retained.

12. A method for manufacturing diffraction gratings or volume holographs as claimed in claim 11, wherein there is included the further step of adding a chemical component after application of the acoustic standing wave to promote setting of the matrix material.

* * * * *